US012707441B2

(12) United States Patent
Vankayala et al.

(10) Patent No.: US 12,707,441 B2
(45) Date of Patent: Aug. 11, 2026

(54) METHOD AND SYSTEM FOR ORAN-CBRS INTERWORKING IN WIRELESS NETWORK

(71) Applicant: SAMSUNG ELECTRONICS CO., LTD., Suwon-si (KR)

(72) Inventors: Satya Kumar Vankayala, Guntur (IN); Mohit Agarwal, Bengaluru (IN); Ritik Prasad Mathur, Bengaluru (IN); Narasimman Subburayalu, Bangalore (IN); Seungil Yoon, Suwon-si (KR); Junhyuk Song, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 745 days.

(21) Appl. No.: 18/094,040

(22) Filed: Jan. 6, 2023

(65) Prior Publication Data

US 2023/0164756 A1 May 25, 2023

Related U.S. Application Data

(63) Continuation of application No. PCT/KR2022/016943, filed on Nov. 1, 2022.

(30) Foreign Application Priority Data

Nov. 2, 2021 (IN) ............................ 202141050290
Oct. 20, 2022 (IN) ............................ 202141050290

(51) Int. Cl.
*H04W 72/0453* (2023.01)
*H04W 72/12* (2023.01)
*H04W 72/121* (2023.01)

(52) U.S. Cl.
CPC ..... *H04W 72/0453* (2013.01); *H04W 72/121* (2013.01); *H04W 72/1215* (2013.01)

(58) Field of Classification Search
CPC .......... H04W 72/0453; H04W 72/121; H04W 72/1215; H04W 72/1231
See application file for complete search history.

(56) References Cited

U.S. PATENT DOCUMENTS 11,477,801 B2 10/2022 Lim et al.
2021/0099844 A1 4/2021 Harel
(Continued)

FOREIGN PATENT DOCUMENTS

KR 10-2021-0051582 5/2021
WO 2021/118281 6/2021

OTHER PUBLICATIONS

Online—CBRS Baseline Standards (Release 1), CBRS WinnForum Standards, https://cbrs.wirelessinnovation.org/release-1-standards-specifications, 2020, 4 pages.
(Continued)

*Primary Examiner* — Sulaiman Nooristany
(74) *Attorney, Agent, or Firm* — NIXON & VANDERHYE P.C.

(57) ABSTRACT

Embodiments herein provide a system for Open Radio access network (RAN)-Citizens Broadband Radio Service (CBRS) interworking in a wireless network. The system includes a RAN including at least one Radio Unit (RU) and a RAN intelligence Controller (RIC), at least one Distributed Unit (DU) in communication with the at least one RU, and at least one CBRS-RU provided within the RAN and in communication with the at least one DU. The at least one CBRS-RU communicates with the at least one DU using a standard model to standardise structure of data shared between the at least one CBRS-RU and the at least one DU.

12 Claims, 11 Drawing Sheets

S1100

(56) References Cited

U.S. PATENT DOCUMENTS

| | | | | |
|---|---|---|---|---|
| 2021/0152229 | A1 | 5/2021 | Du | |
| 2021/0204148 | A1 | 7/2021 | Chou et al. | |
| 2021/0258866 | A1 | 8/2021 | Chou | |
| 2021/0314211 | A1* | 10/2021 | Grayson | H04L 41/0213 |
| 2021/0329467 | A1 | 10/2021 | Sevindik et al. | |
| 2022/0052891 | A1 | 2/2022 | Kulik | |
| 2022/0078631 | A1 | 3/2022 | Salahuddeen et al. | |
| 2022/0110098 | A1 | 4/2022 | Mizrahi | |
| 2022/0141876 | A1 | 5/2022 | Gorain et al. | |
| 2022/0303831 | A1 | 9/2022 | Song et al. | |
| 2022/0345896 | A1* | 10/2022 | Ahmed | H04W 16/14 |

OTHER PUBLICATIONS

Online—OnGo Neutral Host Business Update, CBRS Spectrum, 2020, https://ongoalliance.org/, 3 pages.

Online—Transforming Radio Access Networks Towards Open, Intelligent, Virtualized and Fully Interoperable RAN, O-RAN Specification, 2020, https://www.o-ran.org/, 9 pages.

Indian First Examination Report issued Dec. 20, 2023 in corresponding Indian Patent Application No. 202141050290.

Search Report and Written Opinion dated Feb. 6, 2023 issued in International Patent Application No. PCT/KR2022/016943.

ORAN Alliance, "O-RAN Working Group 4 (Open Fronthaul Interfaces WG) Management Plane Specification", 2022, 260 pages.

ORAN Alliance, "O-RAN Architecture Description", 2022, 38 pages.

ORAN Alliance, "O-RAN Working Group 8 Base Station O-DU and O-CU Software Architecture and APIs", 2022, 141 pages.

* cited by examiner

S1100

METHOD AND SYSTEM FOR ORAN-CBRS INTERWORKING IN WIRELESS NETWORK

CROSS-REFERENCE TO RELATED APPLICATIONS

This application is a continuation of International Application No. PCT/KR2022/016943 designating the United States, filed on Nov. 1, 2022, in the Korean Intellectual Property Receiving Office and claiming priority to Indian Provisional Patent Application No. 202141050290, filed on Nov. 2, 2021, in the Indian Patent Office, and to Indian Complete Patent Application No. 202141050290, filed on Oct. 20, 2022, in the Indian Patent Office, the disclosures of all of which are incorporated by reference herein in their entireties.

BACKGROUND

Field

The disclosure relates to a method and a system of Open Radio access network (ORAN)-Citizens Broadband Radio Service (CBRS)/virtual Radio Access Network (VRAN)-CBRS Interworking.

Description of Related Art

In general, an Open RAN (O-RAN) defines open interfaces between Radio Access Network (RAN) elements. The open-interface enables an operator to deploy their RAN network with multi-vendor solutions. The O-RAN also provides feasibility to deploy Commercial off-the-shelf (COTS) platform and scope to develop various Artificial Intelligence/Machine Learning (AI/ML) based network solutions. The CBRS is lightly licensed spectrum opened for usage by USA Federal Communications Commission (FCC). It is expected that such dynamically shared spectrum will be used globally with various band ranges according to the Government norms. The O-RAN and CBRS support are most sought by the operator (e.g., US operators or the like) and an eventual overlap is inevitable.

The CBRS radio units (RUs) run specialized software to communicate with other RAN elements over proprietary interfaces. This tight product coupling inhibits CBRS band to be used with O-RAN compliant Networks. The CBRS RUs interworking with a distributed unit (DU) in proprietary interfaces should adopt O-RAN standards to integrate to multi-vendor open environment. This would allow vendors to use the same type of O-RAN DU to manage and configure both ORAN and CBRS RUs.

Thus, it is desired to address the above mentioned disadvantages or other shortcomings or at least provide a useful alternative.

SUMMARY

Embodiments of the disclosure provide a method and a system of Open Radio access network (ORAN)-Citizens Broadband Radio Service (CBRS)/virtual Radio Access Network (VRAN)-CBRS interworking. The disclosed method enables on boarding of CBRS RU in O-RAN/long term evolution (LTE) based architecture improves the operating expenditure (OPEX) for operator. Further, the disclosed CBRS RU enables the new spectrum which increases the O-RAN/LTE deployment managed coverage area and quality of service. Further, the disclosed on boarding CBRS RU is similar to other RU with O-RAN standards and enhances the vendor interoperability. Shared cells can benefit from combined usage of licensed and unlicensed LTE/5th generation (5G) bands and CBRS band thereby improving throughput.

According to an example embodiment a system for Open Radio access network (RAN)-Citizens Broadband Radio Service (CBRS) interworking in a wireless network is provided. The system includes: a RAN including at least one Radio Unit (RU) and a RAN intelligence Controller (RIC) (e.g., Near real time (RT) RIC or the like), at least one Distributed Unit (DU) in communication with the at least one RU, and at least one CBRS-RU provided within the RAN and in communication with the at least one DU. The at least one CBRS-RU communicates with the at least one DU using a standard model to standardise structure of data shared between the at least one CBRS-RU and the at least one DU.

In an example embodiment, the standard model stores CBRS-related parameters in the at least one CBRS-RU. The CBRS-related parameters comprise received-power measurement in a CBRS band 3550-3700 MHz for each identifier of the at least one RU. This is further used in Citizens Broadband Radio Service Device (CBSD)-Spectrum Access System (SAS) communication as per WINNF-TS-0016

In an example embodiment, the at least one CBRS-RU and the at least one DU communicate over an Open Fronthaul M-plane Interface that provides standards to support different product variants and technology stacks of multi-operator solutions.

In an example embodiment, the RIC is configured to detect at least one key performance indicator using at least one machine learning model stored at the RIC. The at least one key performance indicator comprises at least one of measurements of RF signal experienced by a User Equipment (UE) for serving or neighbour cells, measurements for UE location, cell utilization measurements regarding actual capacity utilization for a cell site over time, measurements of a UE RF signal, and measurement of cell site capacity utilization. Further, the RIC is configured to determine whether the at least one key performance indicator is meeting a degradation threshold. Further, the RIC is configured to request for one of a CBRS spectrum for the at least one RU and the at least one CBRS-RU which behaves as LTE or 5G systems after configuration.

In an example embodiment, the at least one RAN is configured to determine an interference among a plurality of base stations available in the wireless network on the information of all the base station and respective bandwidth information details stored at the at least one RAN. Further, the at least one RAN is configured to allocate at least one of a physical resource, a modulation & coding scheme, and a sub-carrier spacing to each base station of the plurality of base stations available based on the determined interference.

In an example embodiment, the physical resource is allocated for base stations from CBRS and non-CBRS in the wireless network. The allocated physical resource serves different services for the base station or different set of base stations based on at least one key performance indicator.

In an example embodiment, the at least one CBRS-RU communicates with the at least one DU using a standard model to standardise structure of data shared between the at least one CBRS-RU and the at least one DU by performing, by the at least one CBRS-RU, an RU discovery, detecting, by the at least one CBRS-RU, the at least one RU start-up and an O-RAN M-Plane configuration between the at least one RU and the at least one DU, and exchanging, by the at least one CBRS-RU, the CBRS related parameters in the O-RAN M-plane configuration between the at least one RU and the at least one DU.

In an example embodiment, the O-RAN M-Plane configuration is performed by performing, by the at least one CBRS-RU, a transport layer and recovers at least one IP address of the at least one DU, synchronizing, by the at least one CBRS-RU, the at least one CBRS-RU against a Primary Reference Clock, performing, by the at least one CBRS-RU, a NETCONF call home to the at least one DU, performing, by the at least one DU, a SSH connection establishment, performing, by the at least one CBRS-RU and the at least one DU, a NETCONF capability discovery, performing, by the at least one DU, optional provisioning of new management accounts, performing, by the at least one CBRS-RU and the at least one DU, a supervision of NETCONF connection, performing, by the at least one DU, retrieval of CBRS-RU information, performing, by the at least one DU, a Software (SW) management, configuring, by the at least one DU, transport connectivity checking on the at least one CBRS-RU for enabling the at least one DU to perform C/U-Plane transport connectivity checking between the at least one DU and the at least one CBRS-RU, retrieving, by the at least one DU, the at least one CBRS-RU delay profile from the at least one CBRS-RU, performing, by the at least one DU, U-Plane configuration between the at least one DU and the at least one CBRS-RU, wherein the C/U-Plane transport connectivity between the at least one DU and the at least one CBRS-RU is configured, performing, by the at least one DU, C/U-Plane delay measurements between the at least one DU and the at least one CBRS-RU when the at least one CBRS-RU supports the C/U-Plane performing measurements, performing, by the at least one DU, a fault management activation, activating, by the at least one DU, a performance measurement, retrieving, by the at least one DU, a state of the at least one CBRS-RU including synchronization information from the at least one CBRS-RU, performing, by the at least one CBRS-RU, a measurement of received-power in the CBRS band 3550-3700 MHz, wherein the at least one DU retrieves the data which is then forwarded by the at least one CBRS-RU using the standard model, and configuring, by the at least one DU, the at least one CBRS-RU operational parameters.

In an example embodiment, the system includes a Citizens Broadband Radio Service Device (CBSD) configured to the at least one DU. The CBSD is configured to perform all communications with a Spectrum Access system (SAS), wherein the communication comprises at least one of device registration, spectrum inquiry, grant, heartbeat, relinquishment, and deregistration. The CBSD requests a grant to reserve a portion of the spectrum for their use. If approved, the reservation has been made but the CBSD is not yet authorized to transmit using the grant. The CBSD periodically sends heartbeat requests for each of their approved grants in order to receive authorization to transmit. When the CBSD no longer wishes to use a grant, it relinquishes the grant.

In an example embodiment, the RAN includes at least one of an Open-Radio access network (RAN) device, a Virtualized-RAN (V-RAN) device, a Cloud or Centralized-RAN (C-RAN) device and a cloud based device.

In an example embodiment, the at least one CBRS-RU is compatible for at least one of the O-RAN device, the V-RAN device, the C-RAN device and the cloud based device.

In an example embodiment, the at least one RU is one of a O-RAN RU (O-RU) and an LTE-RU. In an embodiment, the at least one DU is one of a O-RAN DU (O-DU) and an LTE-DU.

According to an example embodiment a method for RAN-CBRS interworking in a wireless network is provided. The method includes: configuring, by a RAN, at least one Radio Unit (RU) and a RAN intelligence Controller (RIC) that enables multi-operator solution to support different technology stacks. Further, the method includes creating, by RAN, a connection between the at least one CBRS-RU provided within the RAN and at least one Distributed Unit (DU), wherein the at least one DU is in communication with the at least one RU. Further, the method includes performing, by the at least one CBRS-RU, a communication with the at least one DU using a standard model to standardise structure of data shared between the at least one CBRS-RU and the at least one DU.

According to embodiments, a system for Open Radio access network (RAN)-Citizens Broadband Radio Service (CBRS) interworking in a wireless network is provided. The system comprises a RAN including at least one Radio Unit (RU) and a RAN intelligence Controller (RIC), at least one Distributed Unit (DU) in communication with the at least one RU, and at least one CBRS-RU provided within the RAN and configured to be in communication with the at least one DU. The at least one CBRS-RU is configured to communicate with the at least one DU using a standard model to standardise structure of data shared between the at least one CBRS-RU and the at least one DU.

According to embodiments, a method for Radio access network (RAN)-Citizens Broadband Radio Service (CBRS) interworking in a wireless network is provided. The method comprises configuring, by a RAN, at least one Radio Unit (RU) and a RAN intelligence Controller (RIC) that enables multi-operator solution to support different technology stacks. The method comprises creating, by RAN, a connection between the at least one CBRS-RU provided within the RAN device and at least one Distributed Unit (DU), wherein the at least one DU is in communication with the at least one RU. The method comprises performing, by the at least one CBRS-RU, communication with the at least one DU using a standard model to standardise structure of data shared between the at least one CBRS-RU and the at least one DU.

According to embodiments, a method performed by a distributed unit (DU) for a citizens broadband radio service (CBRS). The method comprises performing a management-plane (M-plane) configuration for an open radio access network (O-RAN) with a CBRS-radio unit (RU) based on a start-up procedure of the CBRS-RU, receiving, from the CBRS-RU, at least one CBRS parameter in the M-plane configuration, and transmitting, to the CBRS-RU, a configuration of operational parameters for the CBRS-RU.

According to embodiments, a method performed by a citizens broadband radio service (CBRS)-radio unit (RU) comprises performing a discovery for a distributed unit (DU), obtaining a management-plane (M-plane) configuration for an open radio access network (O-RAN) with the DU based on a start-up procedure of the CBRS-RU, and performing a performance measurement based on the M-plane configuration, transmitting, to the DU, at least one CBRS parameter in the M-plane configuration, and receiving, from the DU, a configuration of operational parameters.

According to embodiments, an electronic device of a distributed unit (DU) for a citizens broadband radio service (CBRS), comprises at least one transceiver; and at least one processor operably coupled to the at least one transceiver.

The at least one processor is configured to perform a management-plane (M-plane) configuration for an open radio access network (O-RAN) with a CBRS-radio unit (RU) based on a start-up procedure of the CBRS-RU. The at least one processor is configured to receive, from the CBRS-RU via the at least one transceiver, at least one CBRS parameter in the M-plane configuration. The at least one processor is configured to transmit, to the CBRS-RU via the at least one transceiver, a configuration of operational parameters for the CBRS-RU.

According to embodiments, an electronic device of a citizens broadband radio service (CBRS)-radio unit (RU), comprises at least one transceiver; and at least one processor operably coupled to the at least one transceiver. The at least one processor is configured to perform a discovery for a distributed unit (DU). The at least one processor is configured to obtain a management-plane (M-plane) configuration for an open radio access network (O-RAN) with the DU based on a start-up procedure of the CBRS-RU. The at least one processor is configured to perform a performance measurement based on the M-plane configuration. The at least one processor is configured to transmit, to the DU, at least one CBRS parameter in the M-plane configuration. The at least one processor is configured to receive, from the DU, a configuration of operational parameters.

These and other aspects of the various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the disclosure herein without departing from the scope thereof, and the various embodiments herein include all such modifications.

BRIEF DESCRIPTION OF THE DRAWINGS

The method and the system are illustrated in the accompanying drawings, throughout which like reference letters indicate corresponding parts in the various figures. Further, the above and other aspects, features and advantages of certain embodiments of the present disclosure will be more apparent from the following detailed description, taken in conjunction with the accompanying drawings, in which.

DETAILED DESCRIPTION

Figure 1:
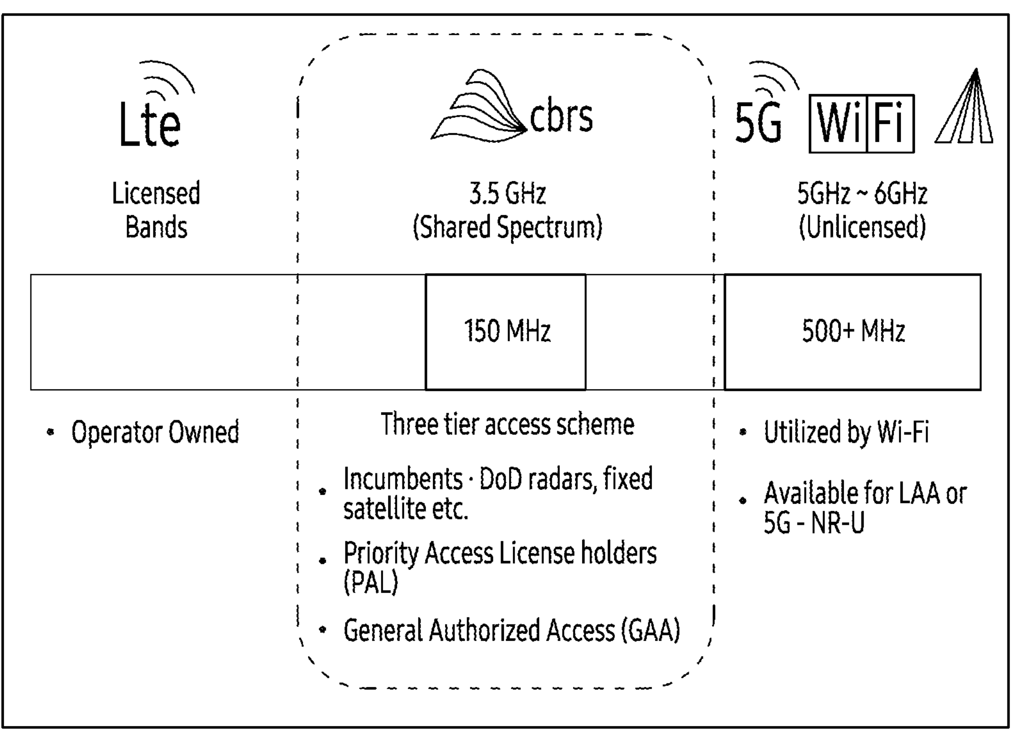
FIG. 1 is a diagram illustrating an example architecture of a 4th generation (4G)/5th generation (5G) and a Citizens Broadband Radio Service (CBRS) spectrum framework.

The various example embodiments herein and the various features and advantageous details thereof are explained more fully with reference to the non-limiting example embodiments illustrated in the accompanying drawings and described in the following description. Descriptions of well-known components and processing techniques may be omitted so as to not unnecessarily obscure the embodiments herein. The various example embodiments described herein are not necessarily mutually exclusive, as various embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced. Accordingly, the examples should not be construed as limiting the scope of the disclosure herein.

Various embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The terms "CBRS-RU" "O-CBRS-RU" and "LTE-CBRS-RU" may be used interchangeably in the present disclosure.

Below are the some of the abbreviations used in the disclosure:

a) CBSD—Citizens Broadband Radio Service Device
b) CBRS—Citizens Broadband Radio Service
c) DP—Domain Proxy
d) FSU—Front-Haul Switching Unit
e) HTTP—Hypertext Transfer Protocol.
f) HTTPS—HTTP over TLS.
g) NMS—Network Management System
h) O-CU-CP—O-RAN Central Unit-Control Plane
i) O-CU-UP—O-RAN Central Unit-User Plane
j) O-DU—O-RAN Distributed Unit
k) O-RU—O-RAN Radio Unit
l) RIC—RAN Intelligent Controller
m) SAS—Spectrum Access System n) vRAN—virtual Radio Access Network
o) CRAN—Cloud Radio Access Network or centralized Radio Access network
p) ORAN—Open Radio access network Below are the some of the units used in in the patent disclosure:

a) RU: Radio Unit
b) O-RU: Open RAN-Radio Unit
c) CBRS-RU: works for the legacy systems.
d) O-CBRS-RU: works with O-DU (open RAN DU). O-CBRS-RU is compatible for the cloud based architectures.
e) LTE-CBRS-RU: This radio unit can work as LTE-Radio unit or CBRS-Radio unit based on the requirement. O-DU will configure the radio unit based on the requirement dynamically.

A difference of the O-CBRS-RU and the LTE-CBRS-RU is that the O-CBRS-RU is compatible for Open RAN systems, whereas the LTE-CBRS-RU is hybrid Radio unit which can either LTE Radio unit or CBRS Radio unit dynamically based on the O-DU dynamic configurations.

Accordingly the various example embodiment herein provide a system for RAN-CBRS interworking in a wireless network. The system includes a RAN including at least one RU and a RIC, at least DU in communication with the at least one RU, and at least one CBRS-RU provided within the RAN and in communication with the at least one DU. The at least one CBRS-RU communicates with the at least one DU using a standard model to standardise structure of data shared between the at least one CBRS-RU and the at least one DU.

The method can be used to provide the ORAN-CBRS/VRAN-CBRS Interworking. The disclosed method is applicable for all cloud architectures. In the disclosed method, the terms O-RAN/VRAN/CRAN is used inter changeably. The disclosed method is applicable to all other cloud architectures with minor modifications. This minor modification can be done by an expert.

In general, the 5G/6G Quality of Services (QoS) are stringent in nature. Whenever Key Performance indicators for different application scenarios, such as eMBB, mMTC and URLLC get impacted then Open RAN/Cloud RAN systems will request for CBRS spectrum from a SAS unit and update the spectrum details to CBRS Radio unit or LTE/5G base station.

Further, machine learning modules in the RAN intelligence Controller (RIC) in the Open-RAN/Cloud RAN systems will detect the key performance indicators degrading and then the O-RAN system will request for the CBRS spectrum for appropriate radio unit/base station. The machine learning modules in the RAN intelligence Controller (RIC) in the Open-RAN/Cloud RAN systems will detect the Key Performance Indicators degrading and then O-RAN system will request for CBRS Radio unit behaves as LTE/5G systems after the configuration.

Resource allocation plays a role in load balancing, resource utilization, and networking performance in the Open-RAN/Cloud RAN systems. By leveraging the free CBRS bandwidth, network will improve the KPI indicators and QoE of the users. The O-RAN systems have the information of all the base station and respective bandwidth information details. Using this information, the O-RAN system will estimate the interference using machine learning module. Interference information can be used for resource allocation, modulation and coding scheme assignment, subcarrier spacing.

Allocating the physical resources for the users from CBRS bandwidth and non-CBRS bandwidth. These bands can serve different services for a user or these bands can serve different set of users based on the KPI requirement.

Referring now to the drawings and more particularly to FIGS. 4 through 11, where similar reference characters denote corresponding features throughout the figures, there are shown various example embodiments.

FIG. 1 is a diagram illustrating an architecture of 4G/5G and CBRS spectrum framework (1000).

In general, for a CBRS system, the CBRS is a 150 MHz wide broadcast band of the 3.5 GHz band (3550 MHz to 3700 MHz) in the United States (US). The use of the CBRS band will not require spectrum licenses, and is expected to reduce the cost of data transmissions. This will enable carriers "to deploy 5G faster and easier, using the shared airwaves instead of trying to acquire spectrum licenses at auction or through deals".

Since these frequencies have historically been used for government purposes, users of the CBRS band will be required to "take care not to interfere with others already using nearby airwave bands in some locations, including military radar stations and satellite receiver stations". As with Wi-Fi, CBRS equipment will be deployed to individual building owners, and those owners, or end users occupying the property, would pay a fee for spectrum allocation through a server. The CBRS alliance companies are more than 60.

The Citizens Broadband Radio Service is governed by a three-tiered spectrum authorization framework to accommodate a variety of commercial uses on a shared basis with incumbent federal and non-federal users of the band in the US. Access and operations will be managed by a dynamic spectrum access system, conceptually similar to the databases used to manage Television White Spaces devices. The three tiers are: Incumbent Access, Priority Access, and General Authorized Access.

Incumbent Access users include authorized federal and fixed satellite service users currently operating in the 3.5 GHz Band. The Priority Access tier includes Priority Access Licenses (PALs) that will be assigned using competitive bidding within the 3550-3650 MHz portion of the band. Each PAL is defined as a non-renewable authorization to use a 10 megahertz channel in a single census tract for three-years. Up to seven total PALs may be assigned in any given census tract with up to four PALs going to any single applicant. Applicants may acquire up to two-consecutive PAL terms in any given license area during the first auction.

The General Authorized Access tier is licensed-by-rule to permit open, flexible access to the band for the widest possible group of potential users. General Authorized Access users are permitted to use any portion of the 3550-3700 MHz band not assigned to a higher tier user and may also operate opportunistically on unused Priority Access channels. Lower frequency bands (especially below 6 GHz) are more reliable, lower path-loss and higher coverage, Easier antenna/RF chain design, power efficient bands.

Further, an O-RAN including a Near-RT RIC handles a radio connection management, the mobility management, the QoS management, the interference management and the data driven model. The disclosed method is not limited to O-RAN. The disclosed method can be used for VRAN or CRAN or any cloud architecture. The disclosed method can be implemented in machine learning or Artificial intelligence modules or blocks or separate non-standard modules. The disclosed method can be implemented in BS or edge cloud or cloud RAN etc.

Further, the O-RAN ALLIANCE is a world-wide community of 300 mobile operators, vendors, and research and academic institutions operating in the Radio Access Network (RAN) industry. O-RAN standards enable a more competitive and vibrant RAN supplier ecosystem with faster innovation. The O-RAN based mobile networks improve the efficiency of RAN deployments and operations.

Empowered by principles of intelligence and openness, the O-RAN architecture is the foundation for building the virtualized RAN on open hardware and cloud, with embedded AI-powered radio control. The architecture is based on standards defined by O-RAN ALLIANCE, which are fully supporting and complimentary to standards promoted by 3GPP and other industry standards organizations. Below are the benefits of the O-RAN:

1. O-RAN Architecture and Specifications,
2. Open Software for the RAN,
3. Testing and Integration of O-RAN Implementations,
4. RAN intelligence module facilitates data analytics of various modules, and
5. All split architectures can be implemented.

The method has various cloud based architecture in the literature such as Virtual RAN, Cloud RAN. Interfaces might change between various modules. The disclosed solution can be used for all cloud architecture.

Referring to FIG. 1, the CBRS creates a framework for 4G and 5G deployments in this band, which is currently under used in the US. In many other countries, the 3.5 GHz band is reserved for 5G deployments. The CBRS spectrum can be shared by multiple Public Land Mobile Network (PLMN) at each location by enabling a Multiple Operator Core Network (MOCN) or Multiple Operator Radio Access Network (MO-RAN).

For indoor wireless networks with only CBRS spectrum, Priority Access License (PAL) users will have reliable access to their allocated channels, with PPA (PAL Protection Area) and the use of the 3.5 GHz band is reserved to incumbents. General Authorized Access (GAA) users will share the remaining spectrum using mechanisms for fair coexistence. For national mobile operators, CBRS provides an opportunity to combine the freedom of unlicensed access with the guarantees of licensed access.

Moreover, it is feasible to combine CBRS with unlicensed spectrum such as 5 GHz License Assisted Access (LAA) and unlocked Gbps peak rates even when only 10 MHz CBRS spectrum has been assigned. It will open considerable, additional capacity for indoor deployment. However, this combination will require standards, RAN (Radio Access Network) and handsets to support it. This is technically possible but will depend on market demand.

Some of the advantages of the CBRS-O-RAN architecture may include:

1. Network service providers will get freely spectrum dynamically.
2. The Base station (BS)/User Equipment (UE) will improve the batter efficiency due to lower path-loss for CBRS frequencies
3. The CBRS Alliance has developed deployment of wireless solutions, and to support widespread market adoption of technologies. Taking the disclosed solution for O-RAN/VRAN architecture will leverage the O-RAN ML/AI features and centralized control.
4. Overall Higher system throughput. The disclosed method can utilize RAN Intelligence controller (RIC module in the O-RAN/CRAN framework) to control the interference, compute the optimal BS transmit power.

5. Lower packet delays of users. Due to availability of free spectrum, O-RAN system can allocate CBRS frequency to different base stations based on the KPIs and user load.
6. Better quality of user's experience, lower jitters due to less Radio Link failures. The O-RAN system can intelligently allocate the spectrum for each BS based on the load conditions to avoid the call drops/handovers.
7. Some indoor/campus uses for CBRS, including Wi-Fi backhaul, secure/critical communications, surveillance, IoT/sensor monitoring with the help of O-RAN/VRAN systems.
8. Since CBRS indoor spectrum generally allows for more output power than for Wi-Fi, the range is better.
9. An advantage for CBRS users, though enterprises who take advantage of the so-called service must pay various monthly fees such as those for the SAS and potentially other ongoing services. We expect that CBRS will be successful in certain verticals.
10. Existence of CBRS could exploit the value of unlicensed spectrum at 900 MHz, 5 GHz, 2.4 GHz, and 6 GHz. We are conducting significant research into each of these and other spectrums.

Below are various potential shortcoming of the existing architecture:

1. Leveraging the O-RAN framework is not there. RAN intelligence controller (RIC) can predict the KPI degradation and load imbalance and request the SAS unit accordingly.
2. Utilizing the Machine learning/Artificial intelligence for allocating the spectrum is not there. This can be done using the machine learning framework.
3. Computing the optimal power transmission of a base station is very crucial due to interference constraints set by CBRS standards body. This feature is not there. This can be done using ML/AI.
4. O-RAN framework can be utilized to allocate the resources for user from multiple frequency bands using ML/AI scheduler.
5. Utilizing the CBRS Radio units as 4G/5G Radio units (CBRS Radio units will act like a 4G/5G radio units) by configuring the parameters on need basis.
6. If the 4G/5G radio units want to utilize the CBRS band instead of transmitting the data using CBRS radio units then, parameters need to be updated using the disclosed solution.
7. Quality of service can be improved due to centralized resource allocation. Higher free CBRS available bandwidth will reduce the radio link failures.
8. Lesser jitters due to lower handovers due to higher spectrum.
9. Lower CAPEX due to free available spectrum for operators on dynamic basis.

Figure 2:
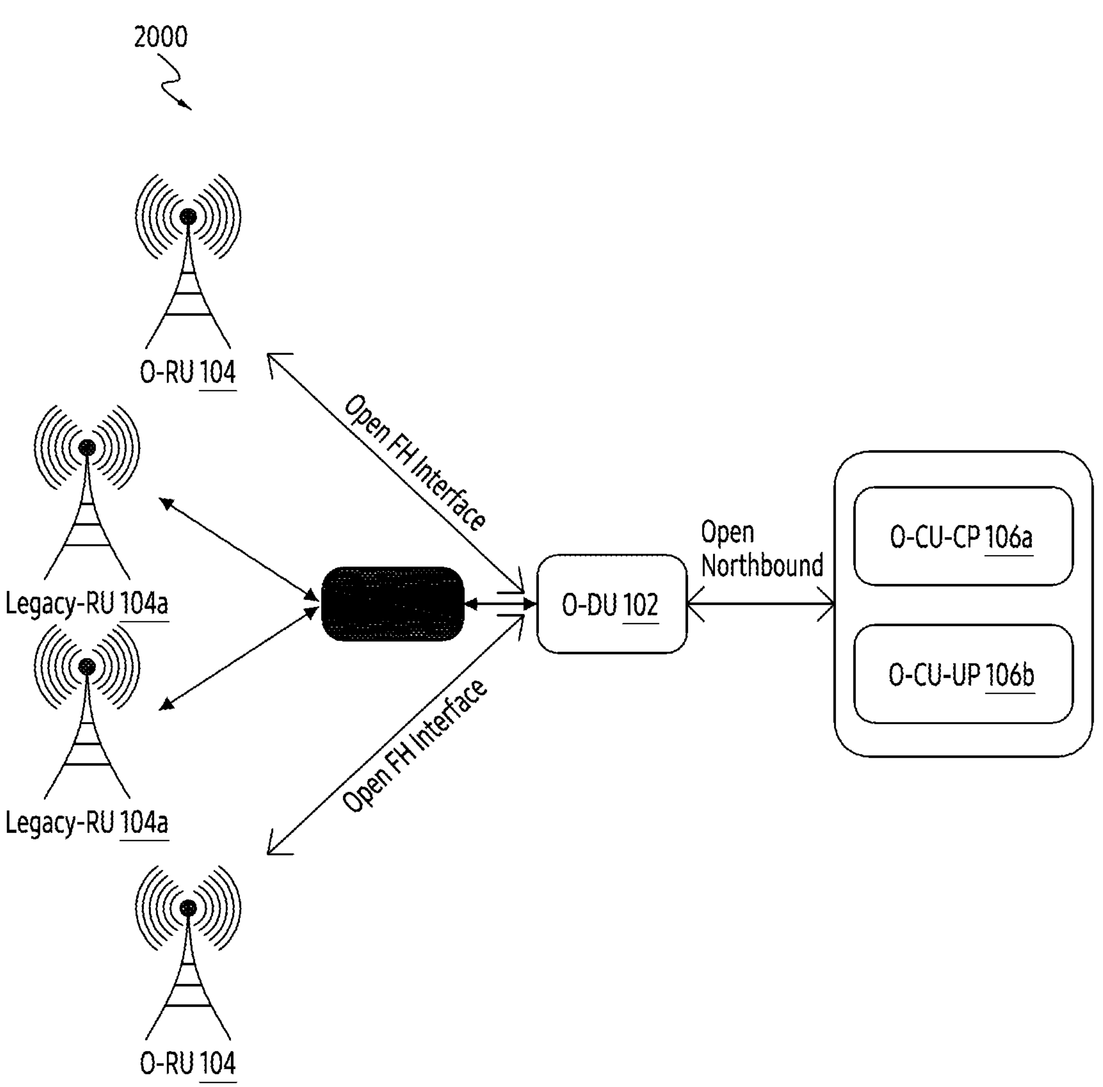
FIG. 2 is a diagram illustrating an example scenario of a simple Open-Radio Access Network (O-RAN) network.

FIG. 2 is a diagram illustrating an example scenario of a simple O-RAN (2000). Referring to FIG. 2, in the O-RAN (2000), the RU (104) and the DU (102) communicate through an Open Front Haul communication. A NETCONF is used as communication protocol and the YANG is the data model. The O-DU (102) communicates a CU plane using a Representational State Transfer (REST)/Virtual Network Function (VNF) Event Stream (VES) interface.

Figure 3:
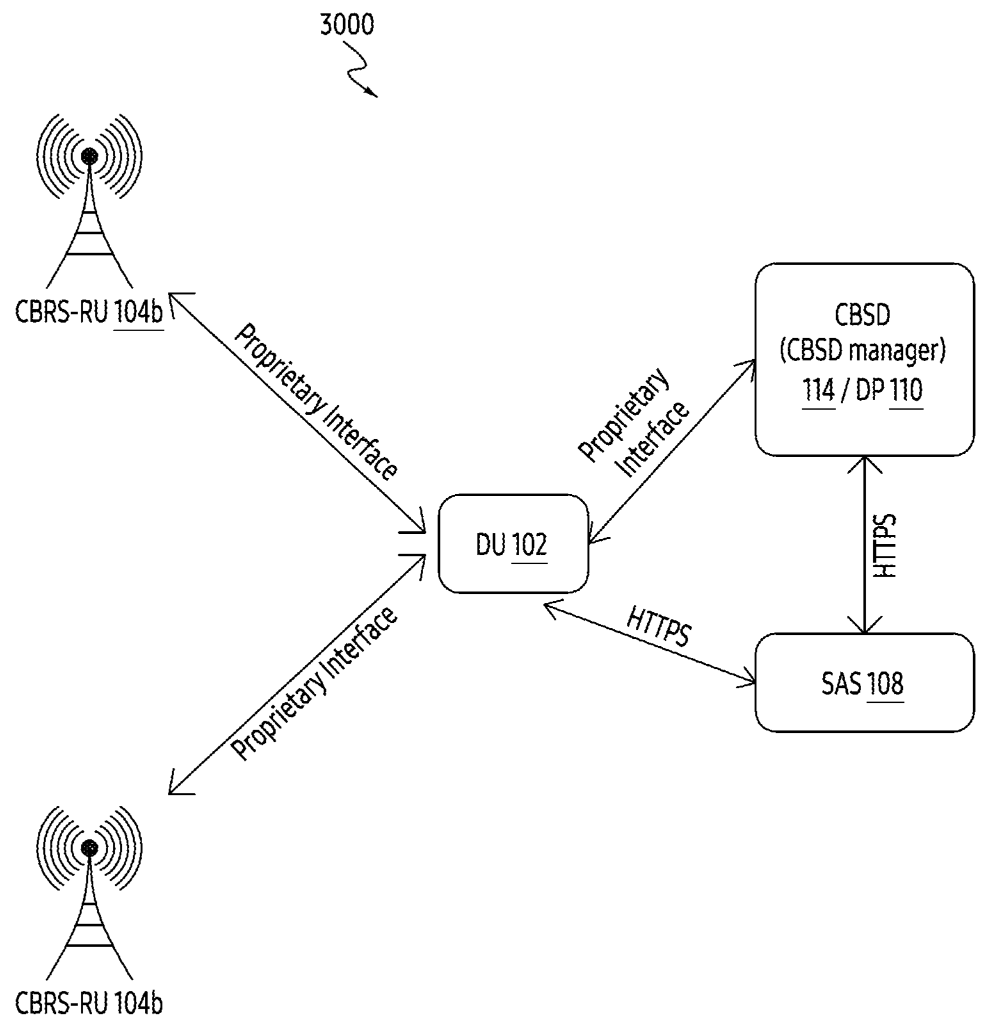
FIG. 3 is a diagram illustrating an example scenario of a simple CBRS network.

FIG. 3 is a diagram illustrating an example scenario of a simple CBRS network (3000). In the CBRS network (3000), the CBRS RU (**104*b*) and the DU (102) as well as the DU (102) and the CU communicates through proprietary interfaces. No standard protocol or data model is adopted. In general, a Domain Proxy (DP) (110) is hosted in the NMS. Standard HTTPS is used between the DP (110) and the SAS (108**).

The RAN sharing and spectrum sharing is all-time evolving technology. Based on the disclosed systems and the methods, the O-RU (102) can be configured through the O-RAN which enables multi-vendor product scope for operators. The ORAN M-Plane Specifications provide standards to support different product variants and technology stacks. Current CBRS RUs are connected with DU using proprietary interfaces. The disclosed standard YANG for exchange of CBRS related parameters in O-RAN M-plane between RU and DU.

Figure 4:
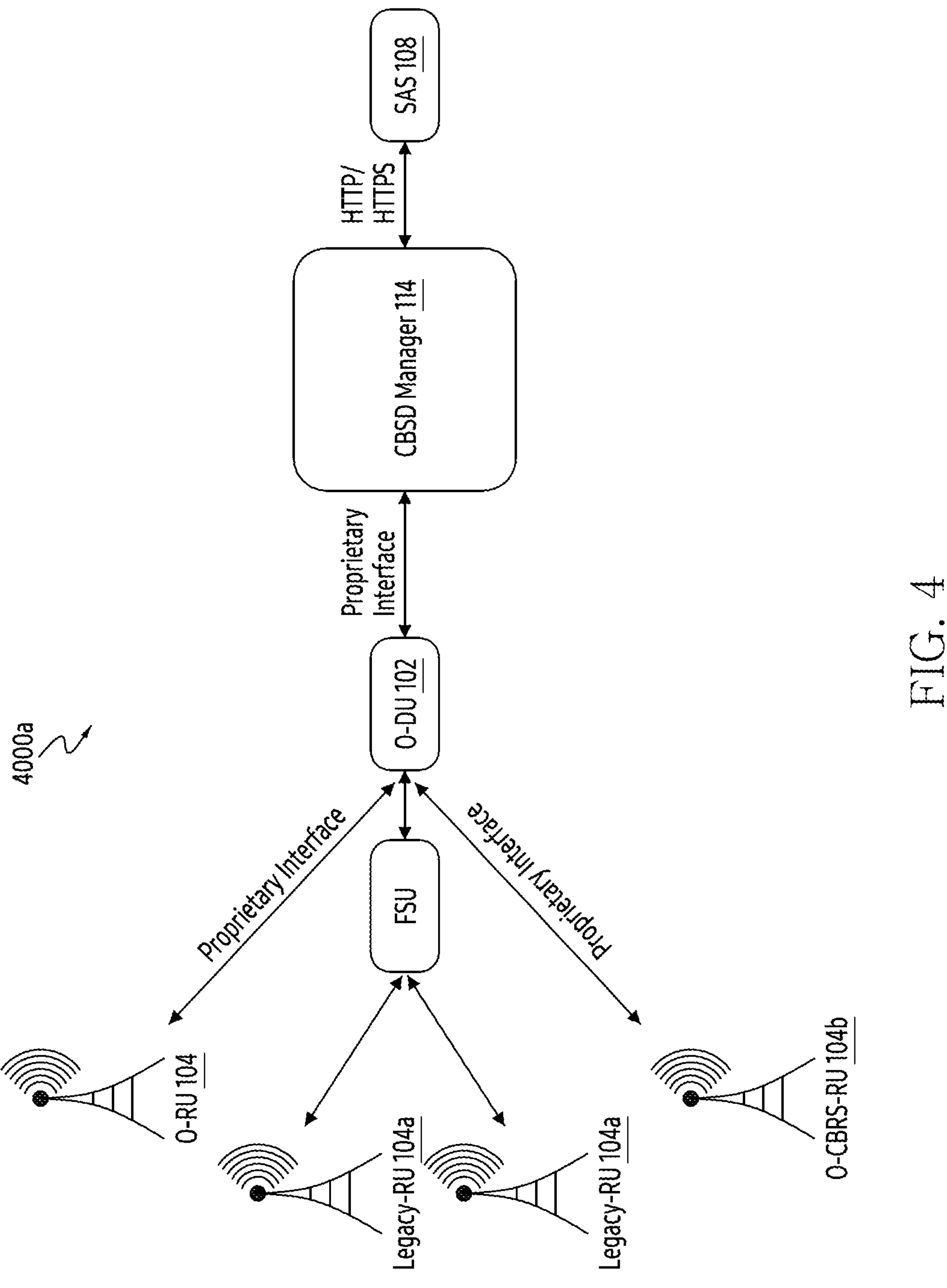
FIG. 4 is a diagram illustrating an example scenario of an O-RAN CBRS, according to various embodiments.
Figure 5:
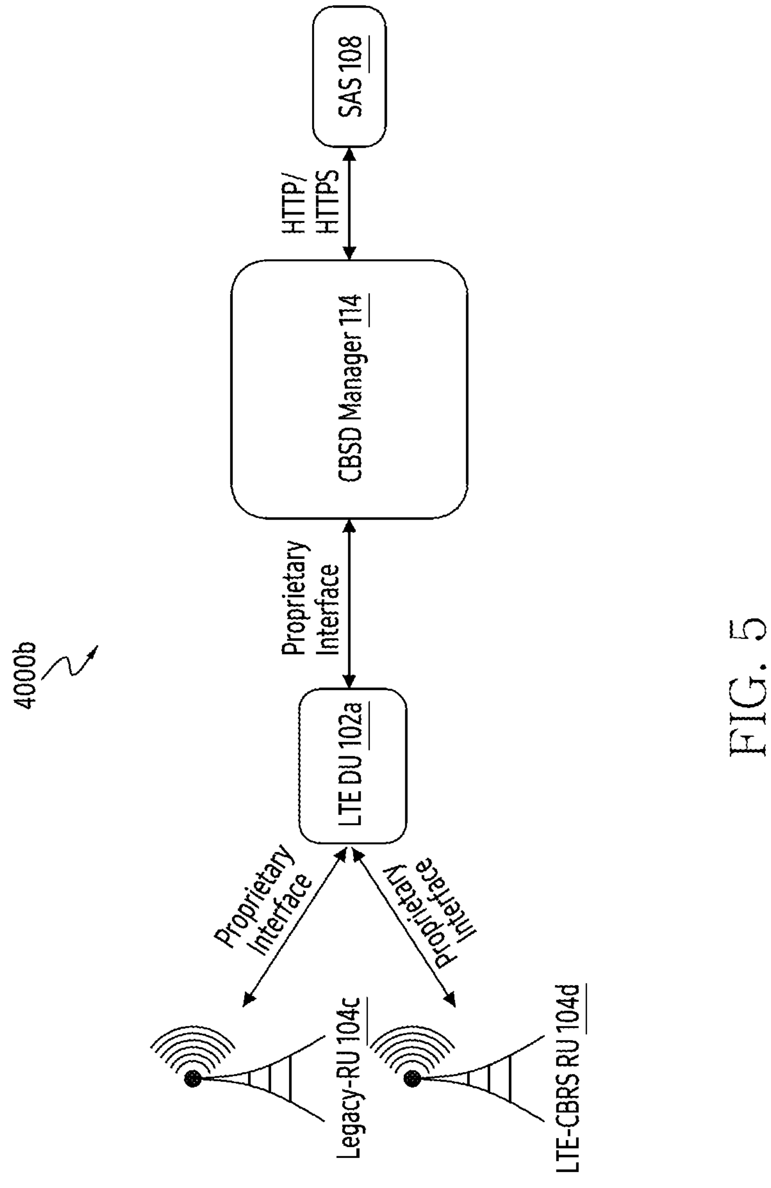
FIG. 5 is a diagram illustrating an example scenario of a LTE-CBRS, according to various embodiments.

FIG. 4 is a diagram illustrating an example scenario of an O-RAN CBRS (4000*a*), according to various embodiments. FIG. 5 is a diagram illustrating an example scenario of an LTE-CBRS (4000*b*), according to various embodiments.

Referring to FIG. 4, the Open RAN (O-RAN) defines open interfaces between RAN elements. This open-interface enables operator to deploy their RAN network with multi-vendor solutions. The O-RAN also provides feasibility to deploy commercial off-the-shelf (COTS) platform and scope to develop various AI/ML based network solutions.

The CBRS is lightly licensed spectrum opened for usage by the USA FCC. It is expected that such dynamically shared spectrum will be used globally with various band ranges according to the Government norms. The O-RAN and CBRS support are most sought by US operators and an eventual overlap is inevitable.

Referring to FIG. 4 and FIG. 5, an effective procedure to manage LTE/5G and CBRS frequency bands to leverage the principles of Citizen Broadband Radio Systems (CBRS). Network service providers can utilize the available CBRS bandwidth in case if the CBRS bandwidth is available. The network service providers have to consider CBRS signal to interference constraint while utilizing the bandwidth by 4G/5G/6G O-RAN Radio Unit. Below are the methods—

The Distributed Unit/O-RAN/CRAN will communicate with CBRS manager (114)/the Domain Proxy (110). The Citizens Broadband Radio Service Device (CBSD) (114) communicates with the SAS (108). The CBSD (114) must initiate all the communication with the SAS (108). The Device Registration, Spectrum enquiry, Grant requests, Heartbeat requests, Relinquish a grant, de-registration are the steps in communication (explained with reference to FIG. 8 to FIG. 10). The O-RAN systems can intelligently utilize the CBRS spectrum for appropriate radio units/base stations. The SAS (108) is a cloud based service that manages the CBRS band. The SAS (108) manages the interference impact on the high priority users. The CBRS (114) needs authorization from the SAS (108) before it starts to transmit in the CBRS band. Based on the grant from the SAS (108), the CBRS device (114) will communicate. In order to protect the highest-priority users, the SAS (108) uses a sensor network of sensors to detect when they're using the spectrum. Sometimes, some portions of the CBRS spectrum are unavailable in some regions.

Referring to FIG. 4, the CBRS RU (104*b*) can interwork like any other O-RU connected with the O-DU (102). For example, the O-DU (102) connects with the O-RU (104). The O-DU (102) connects with the Legacy-RU (104*a*) via the FSU. The O-DU (102) connects with the O-CBRS-RU (104*b*). It will follow the same Start-Up to Operation sequence. The disclosed method provides the enhancement in Operations to support CBRS band.

Referring to FIG. 5, the CBRS RU (104*d*) can interwork like any other LTE-RU connected with the LTE-DU (102*a*). For example, the LTE-DU (102*a*) connects with the Legacy-RU (104*c*) through the proprietary interface. The LTE-DU (102*a*) connects with the LTE-CBRS RU (104*d*) through the proprietary interface. It will follow the same Start-Up to Operation sequence. The disclosed method provides enhancement in Operations to support CBRS band.

Further, in the disclosed method, the O-DU (102)/LTE-DU (102*a*) will exchange CBSD relevant parameters with O-RU/LTE-DU as per the YANG Model. To facilitate this, the new YANG containing CBRS specific parameters will be introduced. The O-CBRS-RU and O-DU will communicate over Open Front haul M-plane Interface. The O-DU/LTE-DU will communicate SAS allotted bandwidth to O-RU/LTE-RU to work as CBRS RU.

Figure 6:
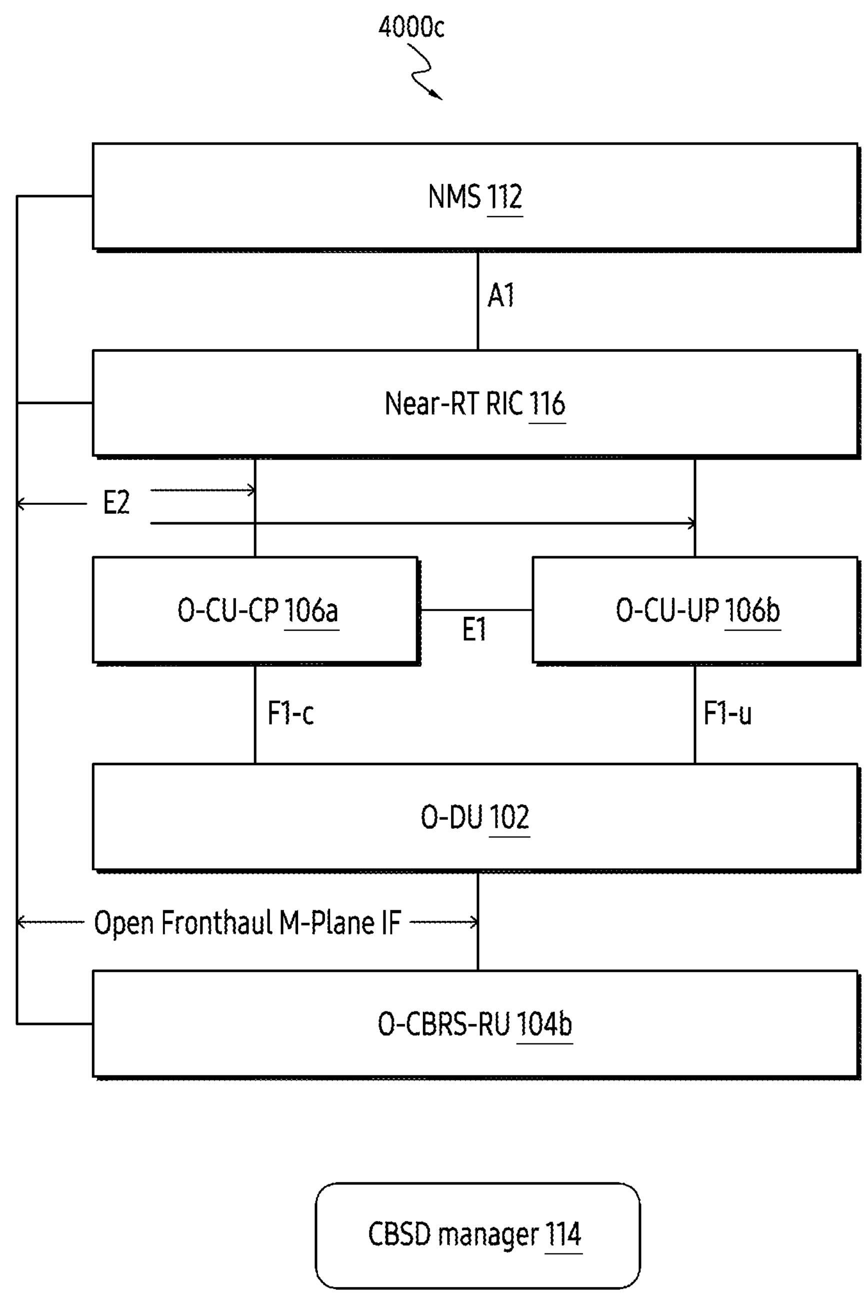
FIG. 6 and FIG. 7 are diagrams illustrating example architectures for O-RAN-CBRS interworking using a Citizens Broadband Radio Service Device (CBSD) manager, according to various embodiments.
Figure 7:
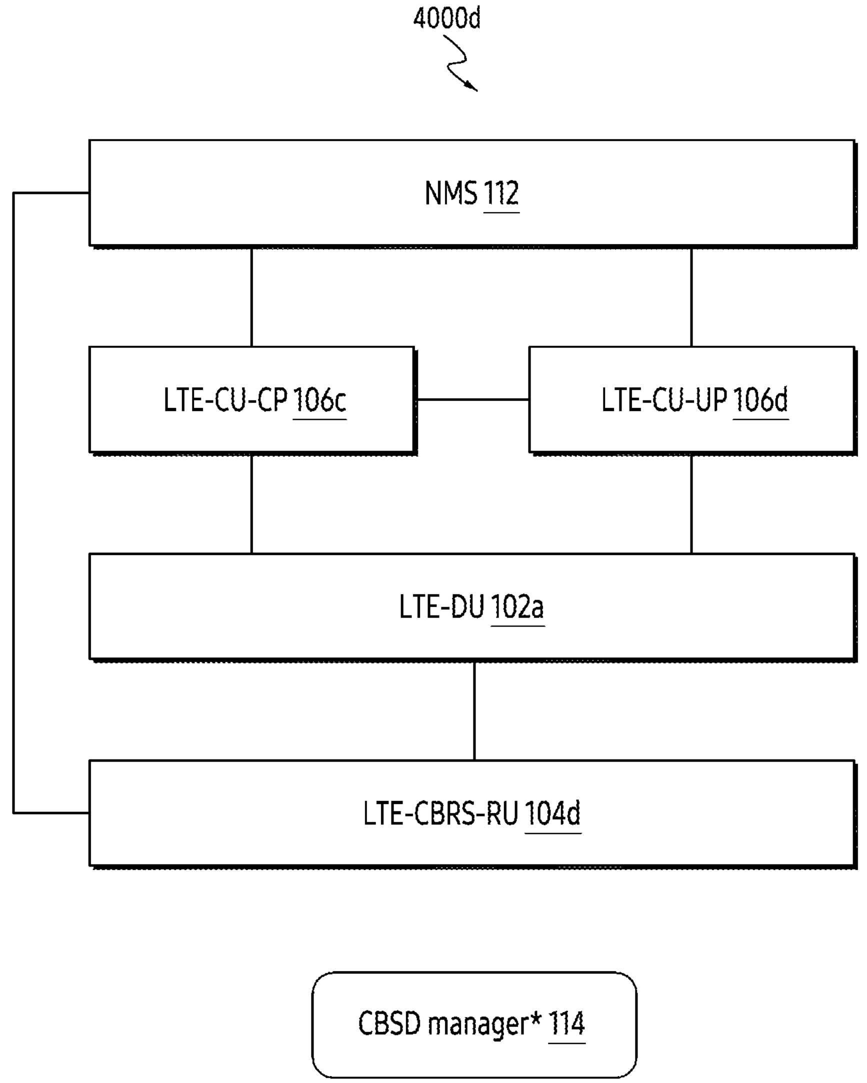

FIG. 6 and FIG. 7 are diagrams illustrating example architectures (4000*c* and 4000*d*) for O-RAN-CBRS interworking using the CBSD manager (114), according to the embodiments as disclosed herein.

Referring to FIG. 6, the CBSD manager (114)/the DP (110) could be hosted in either the NMS (112), the Near RT-RIC (116) or the O-CU-CP (106*a*, 106*b*).

Figure 8:
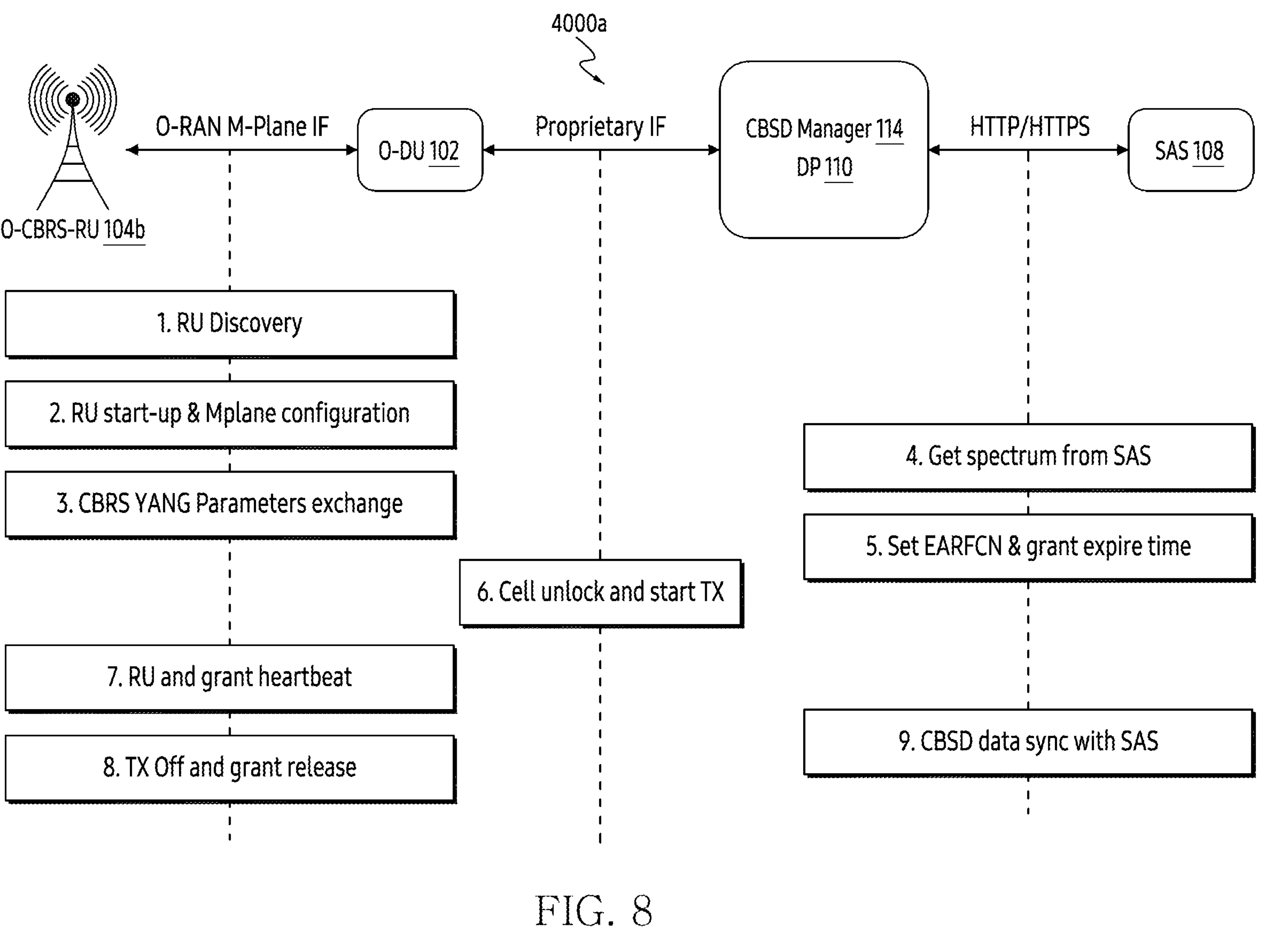
FIG. 8 is a signal flow diagram illustrating example operations for O-RAN-CBRS interworking using the CBSD manager, according to various embodiments.

Referring to FIG. 7, the CBSD Manager (114)/DP (110) could be hosted in either NMS (112), or the LTE-CU-CP (106*c*). The architecture elements may include the following:

a) NMS (112): A Network Management System dedicated to O-RU operations.
b) O-DU (102)/LTE-DU (102*a*) is a logical node hosting PDCP/RLC/MAC/High-PHY layers based on a lower layer functional split.
c) O-RU (104)/LTE-RU (104*c*) is a logical node hosting Low-PHY layer and RF processing based on a lower layer functional split. This is similar to 3GPP's "TRP" or "RRH" but more specific in including the Low-PHY layer.
d) The O-RU (NETCONF Server) can be either managed directly by the O-DU (102) or by the NMS (112) (NETCONF client) in hybrid model of deployment.
e) The Near-RT RIC (116) (aka "O-RAN near-real-time RAN Intelligent Controller") is a logical function that enables near-real-time control and optimization of O-RAN elements and resources via fine-grained data collection and actions over E2 interface.
f) The O-CU-CP (106*a*)/LTE-CU-CP (106*c*) is a logical node hosting the RRC and the control plane part of the PDCP protocol.
g) O-CU-UP (106*b*)/LTE-CU-CP (106*d*) is a logical node hosting the user plane part of the PDCP protocol and the SDAP protocol FIG. 8 is a signal flow diagram illustrating example operations for O-RAN-CBRS interworking using the CBSD manager, according to various embodiments. In operation 1, the CBRS-RU (104*b*) performs the RU discovery. In operation 2, the CBRS-RU (104*b*) detects the at least one RU start-up and an O-RAN M-Plane configuration between the RU and the DU. In operation 3, The CBRS-RU (104*b*) exchanges the CBRS related parameters in the O-RAN M-plane configuration between the RU and the DU. In operation 4, the CBSD Manager (114)/DP (110) gets the spectrum from the SAS (108). In operation 5, the CBSD Manager (114)/DP (110) sets the EARFCN & grant expire time. In operation 6, the O-DU performs the cell unlock and starts transmission. In operation 7, the CBRS-RU (104*b*) performs the RU and grant heartbeat. In operation 8, the CBRS-RU (104*b*) performs transmission Off and grant release. In operation 9, the CBSD Manager (114)/DP (110) performs the CBSD data sync with the SAS (108).

For example, the CBRS related parameters are configured as the following:

TABLE 1

```
module cbrs-oran-parameters {
  namespace “http://xxxx.com/ns/”;
  prefix oran-mplane;
  organization “xxxx”;
  contact “yyyy)”;
  description
    “YANG extensions for O-CBRS RUs.”;
  revision 2021-03-23 {
    description “Initial revision.”;
    reference “ORAN MPlane”;
  }
  container cbrs-measurements {
    description “Container for all CBRS information ”;
    list o-ran-radio-unit-info {
      description
      “This list is the oran radio unit information in DU”;
      key “o-ran-ru-id”;
      leaf o-ran-ru-id {
        description
        “This leaf is the o-ran radio-unit identifier”;
        type string;
      }
      leaf unit-type {
        type access-s5gtype:access-enum-optic-radio-unit-type;
        mandatory true;
        description
        “This leaf is the h/w type of the radio unit.”;
      }
      leaf board-type {
        type access-s5gtype:access-enum-xran-radio-unit-board-type;
        mandatory true;
        description
        “This leaf is the type of the radio unit. The radio unit type varies
by the frequency range, maximum output power, bandwidth, and Tx/Rx
port count.”;
      }
    }
  list cbrs-measure {
      key “measFrequency measBandwidth”;
      description “List Node for RSSI Measurements for CBRS”;
      max-elements 30;
      leaf received-power {
          type float ;
          description “Radio unit power value” ;
      }
      leaf start-frequency {
          type float ;
                range “3550...3695”
          description “Starting frequency in MHz” ;
      }
      leaf bandwidth {
          type float ;
                range “5”;
          description “bandwidth of the measurement in MHz” ;
      }
    }
  }
}
```

Figure 9:
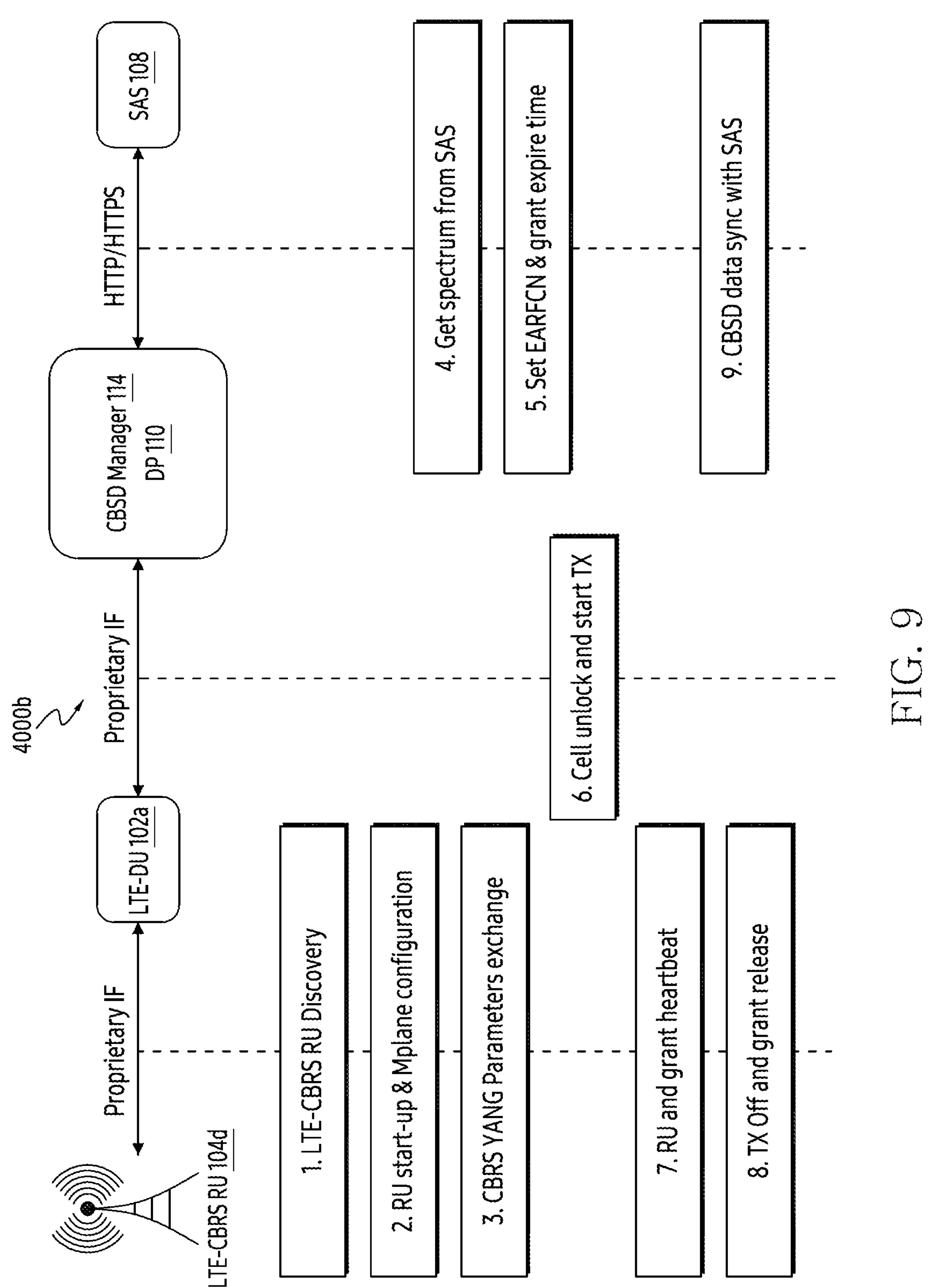
FIG. 9 is a signal flow diagram illustrating example operations for the O-RAN-CBRS interworking using the CBSD manager, according to various embodiments.

FIG. 9 is a signal flow diagram illustrating example operations for O-RAN-CBRS interworking using the CBSD manager, according to various embodiments.

In operation 1, the CBRS-RU (104*b*) performs the LTE-CBRS RU discovery. In operation 2, the CBRS-RU (104*b*) detects the at least one RU start-up and an O-RAN M-Plane configuration between the RU and the DU. In operation 3, The CBRS-RU (104*b*) exchanges the CBRS related parameters in the O-RAN M-plane configuration between the RU and the DU. In operation 4, the CBSD Manager (114)/DP (110) gets the spectrum from the SAS (108). In operation 5, the CBSD Manager (114)/DP (110) sets the EARFCN & grant expire time. In operation 6, the O-DU performs the cell unlock and starts transmission. In operation 7, the CBRS-RU (104*b*) performs the RU and grant heartbeat. In operation 8, the CBRS-RU (104*b*) performs transmission Off and grant release. In operation 9, the CBSD Manager (114)/DP (110) performs the CBSD data sync with the SAS (108).

For example, the CBRS related parameters are configured as the following:

TABLE 2

```
module cbrs-lte-parameters {
  namespace “http://xxxx.com/ns/”;
  prefix lte-mplane;
  organization “xxxx”;
  contact “yyyy”;
  description
    “YANG extensions for LTE-CBRS RUs.”;
  revision 2021-03-23 {
    description “Initial revision.”;
    reference “LTE MPlane”;
  }
  container cbrs-measurements {
    description “Container for all CBRS information ”;
    list lte-radio-unit-info {
      description
      “This list is the LTE radio unit information in DU”;
      key “lte-ru-id”;
      leaf lte-ru-id {
        description
        “This leaf is the LTE radio-unit identifier”;
        type string;
      }
      leaf unit-type {
        type access-s4gtype:access-enum-optic-radio-unit-type;
        mandatory true;
        description
        “This leaf is the h/w type of the radio unit.”;
      }
      leaf board-type {
        type access-s4gtype:access-enum-xran-radio-unit-board-type;
        mandatory true;
        description
        “This leaf is the type of the radio unit. The radio unit type varies
by the frequency range, maximum output power, bandwidth, and Tx/Rx
port count.”;
      }
    }
  list cbrs-measurement {
      key “measFrequency measBandwidth”;
      description “List Node for RSSI Measurements for CBRS”;
      max-elements 30;
      leaf received-power {
          type float ;
          description “Radio unit power value” ;
      }
      leaf start-frequency {
          type float ;
                range “3550...3695”
          description “Starting frequency in MHz” ;
      }
      leaf bandwidth {
          type float ;
                range “5”;
          description “bandwidth of the measurement in MHz” ;
      }
    }
  }
}
```

Figure 10:
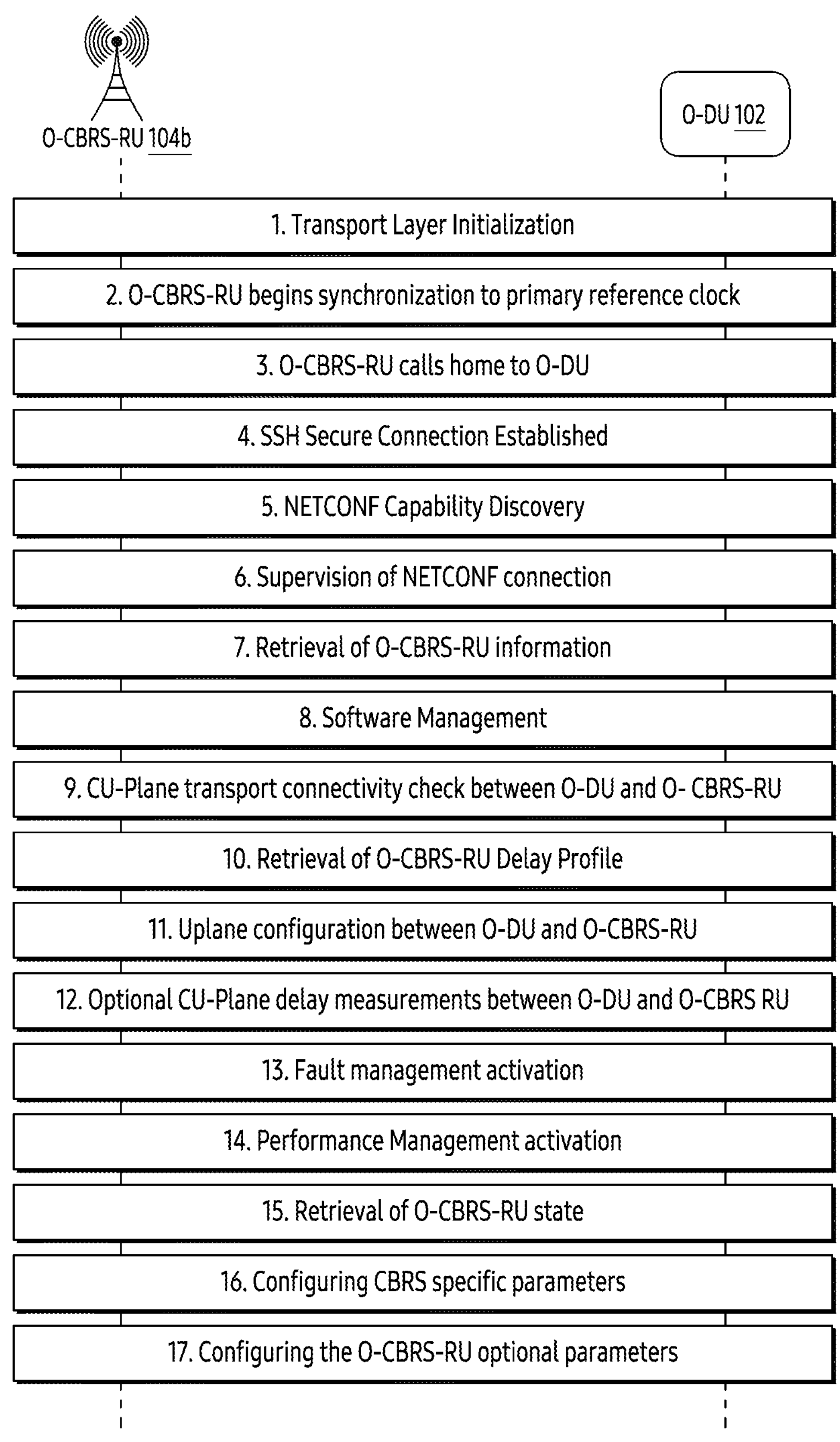
FIG. 10 is a signal flow diagram illustrating an example scenario of a management-plane (M-plane) configuration, according to various embodiments.

FIG. 10 is a signal flow diagram illustrating an example of a management-plane (M-plane) configuration, according to various embodiments. At the power-on of O-CBRS-RU or following an O-CBRS-RU restart, the following procedures are performed for Mplane configuration.

1. The O-CBRS-RU (104*b*) performs transport layer resolution (DHCP, MAC, VLAN, IP, etc.) and recovers the IP address(es) of the O-DU(s) (102).
2. The O-CBRS-RU (104*b*) begins synchronization of the O-CBRS-RU against a Primary Reference Clock.

(please note that step 2 may be in parallel with step 1 for some O-CBRS-RU implementation).

3. The O-CBRS-RU (104*b*) performs NETCONF Call Home to O-DU(s). In order to support NETCONF clients corresponding to known O-RU Controllers (e.g., DU) that either do not attempt to initiate a NETCONF session with the O-RU, or are prohibited from doing so, e.g., because of Network Address Translation limitations, the O-RU shall call home to all known O-RU Controllers with which it does not already have an active NETCONF session.
4. The O-DU (102) performs a SSH connection establishment.
5. The O-CBRS-RU (104*b*) and the O-DU (102) perform NETCONF capability discovery. The O-DU (102) performs optional provisioning of new management accounts (typically only performed once during pre-staging)
6. The O-CBRS-RU (104*b*) and the O-DU (102) perform supervision of NETCONF connection.
7. The O-DU (102) performs retrieval of O-CBRS-RU information.
8. The O-DU (102) performs software (SW) management.
9. The O-DU (102) configures transport connectivity checking on the O-CBRS-RU, enabling the O-DU to perform C/U-Plane transport connectivity checking between O-DU and O-CBRS-RU.
10. The O-DU (102) retrieves the O-CBRS-RU delay profile from the O-CBRS-RU (104*b*).
11. The O-DU (102) performs U-Plane configuration between O-DU and O-CBRS-RU. C/U-Plane transport connectivity between O-DU (102) and O-CBRS-RU is configured as part of this step.
12. The O-DU (102) optionally performs C/U-Plane delay measurements between O-DU and O-CBRS-RU if the O-CBRS-RU supports it.
13. The O-DU (102) performs Fault Management activation.
14. The O-DU (102) activates performance measurement (if required at start-up timing).
15. The O-DU (102) retrieves the O-CBRS-RU state, including synchronization information, from O-CBRS-RU.
16. The O-CBRS-RU (104*b*) performs measurement of received-power in the CBRS band 3550-3700 MHz. O-DU retrieves this data which is then forwarded by O-CBRS-RU using the newly disclosed YANG schema.
17. The O-DU (102) configures the O-CBRS-RU operational parameters for the service available.

For an example, in the disclosed solution, YANG to be exchanged can contain information about:

1. Power value of the Radio-unit,
2. Starting frequency of the power, and
3. Bandwidth of the power.

The disclosed method provides an M-Plane modifications to support CBRS spectrum in O-RU/LTE-RU. The new parameters (e.g., CBRS-related parameters or the like) would be exchanged between O-CBRS RU/LTE-CBRS RU and O-DU/LTE-DU/NMS. The CBRS mode and CBRS specific YANG is synced during RU initialization and configuration of operational parameters.

To obtain working frequency from the Spectrum Access System (SAS) (108), the user has to send Received Signal Strength Indicator (RSSI) Measurement information from RU. Therefore, O-RU/LTE-RU should support RSSI measurement in required channel bandwidth and forward the collected data as per the newly specified YANG model to O-DU/LTE-DU. The SAS (108) will allocate the frequency and the obtained channel will be configured in the O-RU/LTE-RU to activate TX carrier. Only CBRS RUs will have to use the new YANG. Non-CBRS RU can interwork with the same O-DU/LTE-RU as before.

The disclosed method enabling on boarding of CBRS RU in O-RAN/LTE based architecture improves the OPEX for operator. Further, the disclosed CBRS RU enables the new spectrum which increases the O-RAN/LTE deployment managed coverage area and quality of service. Further, the disclosed on boarding CBRS RU similar to other RU with O-RAN standards enhances the vendor interoperability. Shared cells can benefit from combined usage of licensed and unlicensed LTE/5G bands and CBRS band thereby improving throughput.

Figure 11:
FIG. 11 is a flowchart illustrating an example method for O-RAN-CBRS interworking in a wireless network, according to various embodiments.
Figure 11:
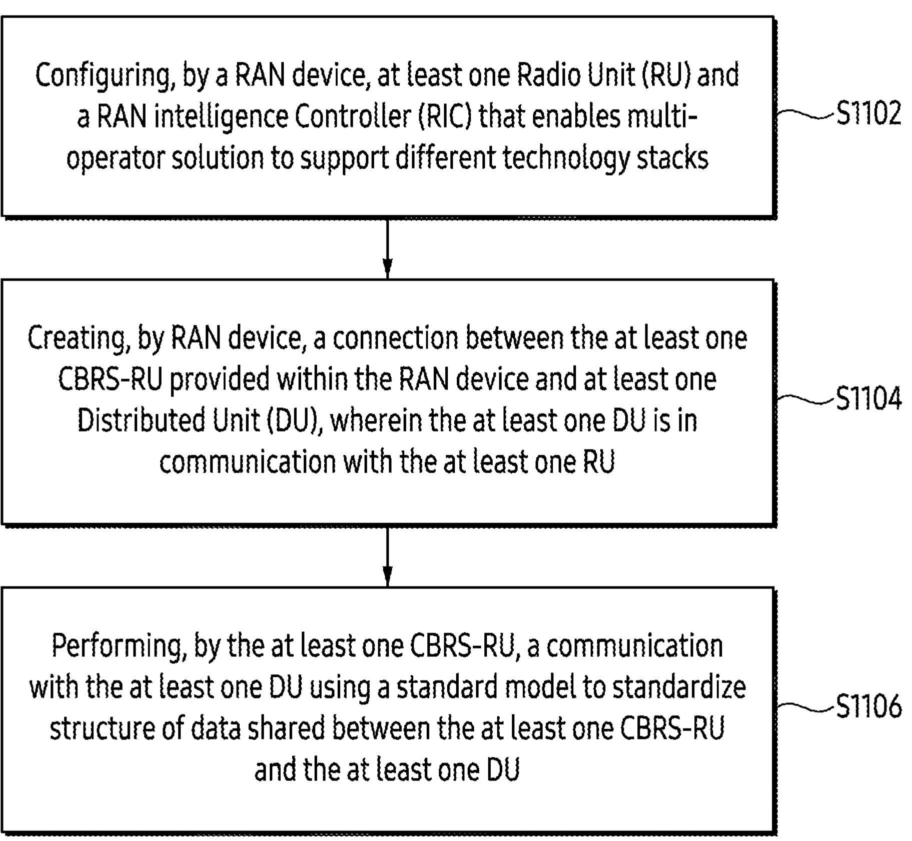

FIG. 11 is a flowchart (S1100) illustrating an example method for O-RAN-CBRS interworking in the wireless network, according to various embodiments.

At S1102, the method includes configuring, by the RAN (e.g., RAN device, V-RAN device, C-RAN device, cloud based device or the like), at least one RU (e.g., O-RAN RU (O-RU), LTE-RU or the like) and a RAN intelligence Controller (RIC) that enables multi-operator solution to support different technology stacks. At S1104, the method includes creating, by the RAN, a connection between the at least one CBRS-RU provided within the RAN and at least one Distributed Unit (DU) e.g., O-DU, LTE-DU or the like, wherein the at least one DU is in communication with the at least one RU. At S1106, the method includes performing, by the at least one CBRS-RU, a communication with the at least one DU using a standard model to standardise structure of data shared between the at least one CBRS-RU and the at least one DU. The CBRS-RU is compatible for at least one of the O-RAN device, the V-RAN device, the C-RAN device and the cloud based device. The at least one CBRS-RU and the at least one DU communicates over an Open Front-haul M-plane Interface that provides standards to support different product variants and technology stacks of multi-operator solutions. The standard model stores CBRS-related parameters in the at least one CBRS-RU, and the CBRS-related parameters comprises received-power measurement in a CBRS band 3550-3700 MHz for each identifier of the at least one RU.

The RIC detects the at least one key performance indicator using at least one machine learning model stored at the RIC, wherein the at least one key performance indicator comprises at least one of measurements of RF signal experienced by a User Equipment (UE) for serving or neighbour cells, measurements for UE location, cell utilization measurements regarding actual capacity utilization for a cell site over time, measurements of a UE RF signal, and measurement of cell site capacity utilization. Further, the RIC determines whether the at least one key performance indicator is meeting a degradation threshold. Further, the RIC requests for one of a CBRS spectrum for the at least one RU and the at least one CBRS-RU which behaves as LTE or 5G systems after configuration.

The various actions, acts, blocks, steps, or the like in the flow charts (S1100) may be performed in the order presented, in a different order or simultaneously. Further, in various embodiments, some of the actions, acts, blocks, steps, or the like may be omitted, added, modified, skipped, or the like without departing from the scope of the disclosure.

We propose M-Plane modifications to support CBRS spectrum in O-RU/LTE-RU.

The new parameters would be exchanged between O-CBRS RU/LTE-CBRS RU and O-DU/LTE-DU/NMS.

CBRS mode and CBRS specific YANG is synced during RU initialization and configuration of operational parameters.

To obtain working frequency from Spectrum Access System we have to send RSSI Measurement information from RU. Therefore, O-RU/LTE-RU should support RSSI measurement in required channel bandwidth and forward the collected data as per the newly specified YANG model to O-DU/LTE-DU.

SAS will allocate the frequency and the obtained channel will be configured in the O-RU/LTE-RU to activate TX carrier.

Only CBRS RUs will have to use the new YANG. Non-CBRS RU can interwork with the same O-DU/LTE-RU as before.

CBRS supporting RUs will be measuring the RSSI values on the CBRS band 3550-3700 MHz divided in 30 channels of 5 MHz.E The calculations per RU will be shared in the data model defined by the attached YANG. It contains the list of power measurements per CBRS RU and its details.

The YANG will be used by CBRS RU and O-DU to standardize the structure of shared data.

According to embodiments, a system for Open Radio access network (RAN)-Citizens Broadband Radio Service (CBRS) interworking in a wireless network is provided. The system comprises a RAN including at least one Radio Unit (RU) and a RAN intelligence Controller (RIC), at least one Distributed Unit (DU) in communication with the at least one RU, and at least one CBRS-RU provided within the RAN and configured to be in communication with the at least one DU. The at least one CBRS-RU is configured to communicate with the at least one DU using a standard model to standardise structure of data shared between the at least one CBRS-RU and the at least one DU.

In an example embodiment, the standard model is configured to store CBRS-related parameters in the at least one CBRS-RU, and wherein the CBRS-related parameters comprise received-power measurement in a CBRS band in a range of 3550-3700 MHz for each identifier of the at least one RU.

In an example embodiment, the at least one CBRS-RU and the at least one DU are configured to communicate over an Open Front-haul M-plane Interface that provides standards to support different product variants and technology stacks of multi-operator solutions.

In an example embodiment, the RIC is configured to detect at least one key performance indicator using at least one machine learning model stored at the RIC, wherein the at least one key performance indicator comprises at least one of measurements of RF signal experienced by a User Equipment (UE) for serving or neighbour cells, measurements for UE location, cell utilization measurements regarding actual capacity utilization for a cell site over time, measurements of a UE RF signal, and measurement of cell site capacity utilization. The RIC is configured to determine whether the at least one key performance indicator meets a degradation threshold. The RIC is configured to request one of a CBRS spectrum for the at least one RU and at least one CBRS-RU which behaves as LTE or 5G systems after configuration.

In an example embodiment, the at least one CBRS-RU is configured to communicate with the at least one DU using a standard model to standardise structure of data shared between the at least one CBRS-RU and the at least one DU by performing, by the at least one CBRS-RU, an RU discovery, detecting, by the at least one CBRS-RU, the at least one RU start-up and an O-RAN M-Plane configuration between the at least one RU and the at least one DU, and exchanging, by the at least one CBRS-RU, the CBRS related parameters in the O-RAN M-plane configuration between the at least one RU and the at least one DU.

In an example embodiment, the system comprises a Citizens Broadband Radio Service Device (CBSD) configured as the at least one DU, wherein the CBSD is configured to perform all communications with a Spectrum Access system (SAS), wherein the communication comprises at least one of device registration, spectrum inquiry, grant, heartbeat, relinquishment, and deregistration.

In an example embodiment, the RAN includes at least one of an Open-Radio access network (RAN) device, a Virtualized-RAN (V-RAN) device, a Cloud or Centralized-RAN (C-RAN) device and a cloud based device.

In an example embodiment, the at least one CBRS-RU is compatible with at least one of the O-RAN device, the V-RAN device, the C-RAN device and the cloud based device.

In an example embodiment, the at least one RU includes one of a O-RAN RU (O-RU) and an LTE-RU and the at least one DU includes one of a O-RAN DU (O-DU) and an LTE-DU.

According to embodiments, a method for Radio access network (RAN)-Citizens Broadband Radio Service (CBRS) interworking in a wireless network is provided. The method comprises configuring, by a RAN, at least one Radio Unit (RU) and a RAN intelligence Controller (RIC) that enables multi-operator solution to support different technology stacks. The method comprises creating, by RAN, a connection between the at least one CBRS-RU provided within the RAN device and at least one Distributed Unit (DU), wherein the at least one DU is in communication with the at least one RU. The method comprises performing, by the at least one CBRS-RU, communication with the at least one DU using a standard model to standardise structure of data shared between the at least one CBRS-RU and the at least one DU.

In an example embodiment, the standard model stores CBRS-related parameters in the at least one CBRS-RU, and wherein the CBRS-related parameters comprise received-power measurement in a CBRS band in a range of 3550-3700 MHz for each identifier of the at least one RU.

In an example embodiment, the at least one CBRS-RU and the at least one DU communicate over an Open Front-haul M-plane Interface that provides standards to support different product variants and technology stacks of multi-operator solutions.

In an example embodiment, the method comprises detecting, by the RIC, at least one key performance indicator using at least one machine learning model stored at the RIC, wherein the at least one key performance indicator comprises at least one of measurements of RF signal experienced by a User Equipment (UE) for serving or neighbour cells, measurements for UE location, cell utilization measurements regarding actual capacity utilization for a cell site over time, measurements of a UE RF signal, and measurement of cell site capacity utilization. The method comprises determining, by the RIC, whether the at least one key performance indicator meets a degradation threshold. The method comprises requesting, by the RIC, for one of a CBRS spectrum for the at least one RU and the at least one CBRS-RU which behaves as LTE or 5G systems after configuration.

In an example embodiment, the at least one CBRS-RU communicates with the at least one DU using the standard model to standardise structure of data shared between the at least one CBRS-RU and the at least one DU by performing, by the at least one CBRS-RU, an RU discovery, detecting, by the at least one CBRS-RU, the at least one RU start-up and an O-RAN M-Plane configuration between the at least one RU and the at least one DU, and exchanging, by the at least one CBRS-RU, the CBRS related parameters in the O-RAN M-plane configuration between the at least one RU and the at least one DU.

In an example embodiment, the method comprises performing, by a Citizens Broadband Radio Service Device (CBSD), all communications with a Spectrum Access system (SAS), wherein the CBSD is connected to the at least one DU. The CBSD is configured to perform, and wherein the communications comprise at least one of device registration, spectrum enquiry, grant requests, heartbeat requests, relinquish a grant, and de-registration.

In an example embodiment, the RAN includes at least one of an Open-Radio access network (RAN) device, a Virtualized-RAN (V-RAN) device, a Cloud or Centralized-RAN (C-RAN) device and a cloud based device.

In an example embodiment, the at least one CBRS-RU is compatible with at least one of the O-RAN device, the V-RAN device, the C-RAN device and the cloud based device.

In an example embodiment, the at least one RU includes one of a O-RAN RU (O-RU) and an LTE-RU and the at least one DU incudes one of a O-RAN DU (O-DU) and an LTE-DU.

An effective procedure to manage LTE/5G and CBRS frequency bands to leverage the principles of Citizen Broadband Radio Systems (CBRS). Network service providers can utilize the available CBRS bandwidth in case if the CBRS bandwidth is available. Network service providers have to consider CBRS signal to interference constraint while utilizing the bandwidth by 4G/5G/6G O-RAN Radio Unit.

Distributed Unit/O-RAN/CRAN will communicate with CBRS manager/Domain Proxy. Citizens Broadband Radio Service Device (CBSD) communicates with the SAS. CBSD must initiate all the communication with the SAS. Device Registration, Spectrum enquiry, Grant requests, Heartbeat requests, Relinquish a grant, de-registration are the steps in communication. O-RAN systems can intelligently utilize the CBRS spectrum for appropriate radio units/base stations.

Spectrum Access system (SAS) is a cloud based service that manages the CBRS band. Manages the interference impact on the high priority users.

CBRS device needs authorization from the SAS before it starts to transmit in the CBRS band. Based on the grant from SAS, CBRS device will communicate.

To protect the highest-priority users, the SAS uses a sensor network of sensors to detect when they're using the spectrum. Sometimes, some portions of the CBRS spectrum is unavailable in some regions.

Quality of Service

5G/6G Quality of Services (QoS) are stringent in nature. Whenever Key Performance indicators for different application scenarios, such as eMBB, mMTC and URLLC get impacted then Open RAN/Cloud RAN systems will request for CBRS spectrum from SAS unit and update the spectrum details to CBRS Radio unit or LTE/5G base station.

Machine learning modules in the RAN intelligence Controller (RIC) in the Open-RAN/Cloud RAN will detect the Key Performance Indicators degrading and then O-RAN system will request for the CBRS spectrum for appropriate radio unit/base station.

Machine learning modules in the RAN intelligence Controller (RIC) in the Open-RAN/Cloud RAN will detect the Key Performance Indicators degrading and then O-RAN system will request for CBRS Radio unit behaves as LTE/5G systems after the configuration.

Resource Allocation

Resource allocation plays a pivotal role in load balancing, resource utilization, and networking performance. By leveraging the free CBRS bandwidth, network will improve the KPI indicators and QoE of the users.

O-RAN systems has the information of all the base station and respective bandwidth information details. Using this information, O-RAN system will estimate the interference using Machine learning module. Interference information can be used for resource allocation, modulation & coding scheme assignment, sub-carrier spacing.

Allocating the physical resources for the users from CBRS bandwidth and non-CBRS bandwidth. These bands can serve different services for an user or these bands can serve different set of users based on the KPI requirement.

According to embodiments, a method performed by a distributed unit (DU) for a citizens broadband radio service (CBRS). The method comprises performing a management-plane (M-plane) configuration for an open radio access network (O-RAN) with a CBRS-radio unit (RU) based on a start-up procedure of the CBRS-RU, receiving, from the CBRS-RU, at least one CBRS parameter in the M-plane configuration, and transmitting, to the CBRS-RU, a configuration of operational parameters for the CBRS-RU.

In an example embodiment, the at least one CBRS parameter comprises at least one of power information for indicating a power of the RU, frequency information for indicating a starting frequency for the power, and bandwidth information for indicating a bandwidth for the power.

In an example embodiment, the at least one CBRS parameter is associated with a received power measurement in a CBRS band for each RU identifier.

In an example embodiment, the performing of the M-plane configuration comprises performing a secure shell (SSH) connection establishment, performing a user-plane (U-plane) configuration between the CBRS-RU and the DU, activating a performance measurement of the CBRS-RU, and obtaining, from the CBRS-RU, state information including synchronization information. The start-up procedure is performed at a power-on of the CBRS-RU or following an CBRS-RU restart.

In an example embodiment, the at least one CBRS parameter is specified in a data model according to a yet another next generation (YANG) model.

According to embodiments, a method performed by a citizens broadband radio service (CBRS)-radio unit (RU) comprises performing a discovery for a distributed unit (DU), obtaining a management-plane (M-plane) configuration for an open radio access network (O-RAN) with the DU based on a start-up procedure of the CBRS-RU, and performing a performance measurement based on the M-plane configuration, transmitting, to the DU, at least one CBRS parameter in the M-plane configuration, and receiving, from the DU, a configuration of operational parameters.

In an example embodiment, the at least one CBRS parameter comprises at least one of power information for indicating a power of the RU, frequency information for indicating a starting frequency for the power, and bandwidth information for indicating a bandwidth for the power.

In an example embodiment, the at least one CBRS parameter is associated with a received power measurement in a CBRS band for each RU identifier.

In an example embodiment, the obtaining of the M-plane configuration comprises performing a transport layer resolution and recovering an internet protocol (IP) address of the DU, performing a synchronization with a primary reference clock, and performing a network configuration (NETCONF) call home procedure to the DU. The start-up procedure is performed at a power-on of the CBRS-RU or following an CBRS-RU restart.

In an example embodiment, the at least one CBRS parameter is specified in a data model according to a yet another next generation (YANG) model.

According to embodiments, an electronic device of a distributed unit (DU) for a citizens broadband radio service (CBRS), comprises at least one transceiver; and at least one processor operably coupled to the at least one transceiver. The at least one processor is configured to perform a management-plane (M-plane) configuration for an open radio access network (O-RAN) with a CBRS-radio unit (RU) based on a start-up procedure of the CBRS-RU. The at least one processor is configured to receive, from the CBRS-RU via the at least one transceiver, at least one CBRS parameter in the M-plane configuration. The at least one processor is configured to transmit, to the CBRS-RU via the at least one transceiver, a configuration of operational parameters for the CBRS-RU.

In an example embodiment, the at least one CBRS parameter comprises at least one of power information for indicating a power of the RU, frequency information for indicating a starting frequency for the power, and bandwidth information for indicating a bandwidth for the power.

In an example embodiment, the at least one CBRS parameter is associated with a received power measurement in a CBRS band for each RU identifier.

In an example embodiment, to perform the M-plane configuration, the at least one processor is configured to perform a secure shell (SSH) connection establishment. To perform the M-plane configuration, the at least one processor is configured to perform a user-plane (U-plane) configuration between the CBRS-RU and the DU. To perform the M-plane configuration, the at least one processor is configured to activate a performance measurement of the CBRS-RU. To perform the M-plane configuration, the at least one processor is configured to obtain, from the CBRS-RU, state information including synchronization information. The start-up procedure is performed at a power-on of the CBRS-RU or following an CBRS-RU restart.

In an example embodiment, the at least one CBRS parameter is specified in a data model according to a yet another next generation (YANG) model.

According to embodiments, an electronic device of a citizens broadband radio service (CBRS)-radio unit (RU), comprises at least one transceiver; and at least one processor operably coupled to the at least one transceiver. The at least one processor is configured to perform a discovery for a distributed unit (DU). The at least one processor is configured to obtain a management-plane (M-plane) configuration for an open radio access network (O-RAN) with the DU based on a start-up procedure of the CBRS-RU. The at least one processor is configured to perform a performance measurement based on the M-plane configuration. The at least one processor is configured to transmit, to the DU, at least one CBRS parameter in the M-plane configuration. The at least one processor is configured to receive, from the DU, a configuration of operational parameters.

In an example embodiment, the at least one CBRS parameter comprises at least one of power information for indicating a power of the RU, frequency information for indicating a starting frequency for the power, and bandwidth information for indicating a bandwidth for the power.

In an example embodiment, the at least one CBRS parameter is associated with a received power measurement in a CBRS band for each RU identifier.

In an example embodiment, to obtain the M-plane configuration, the at least one processor is configured to perform a transport layer resolution and recovering an internet protocol (IP) address of the DU. To obtain the M-plane configuration, the at least one processor is configured to perform a synchronization with a primary reference clock. To obtain the M-plane configuration, the at least one processor is configured to perform a network configuration (NETCONF) call home procedure to the DU. The start-up procedure is performed at a power-on of the CBRS-RU or following an CBRS-RU restart.

In an example embodiment, the at least one CBRS parameter is specified in a data model according to a yet another next generation (YANG) model.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by an open radio access network distributed unit (O-DU), the method comprising:

transmitting a management-plane (M-plane) configuration for requesting a citizens broadband radio service (CBRS) measurement to radio unit (RU), the M-plane configuration including bandwidth information for indicating a bandwidth for the CBRS measurement and frequency information for indicating a starting frequency for the CBRS measurement; and receiving CBRS parameters including received signal strength indicator (RSSI) information for the CBRS measurement from the RU based on the M-plane configuration, wherein a data structure of the CBRS parameters is determined based on a type of the RU.

2. The method of claim 1, further comprising:

performing a secure shell (SSH) connection establishment;

performing a user-plane (U-plane) configuration between the RU and the O-DU;

activating a performance measurement of the RU; and obtaining, from the RU, state information including synchronization information.

3. The method of claim 1, receiving at least one CBRS parameter from the RU, wherein the at least one CBRS parameter is specified in a data model according to a yet another next generation (YANG) model, wherein the type of the RU is one of a CBRS RU or a non-CBRS RU.

4. A method performed by a radio unit (RU), the method comprising:

receiving a management-plane (M-plane) configuration for requesting a citizens broadband radio service (CBRS) measurement from an open radio access network distributed unit (O-DU), the M-plane configuration including bandwidth information for indicating a bandwidth for the CBRS measurement and frequency information for indicating a starting frequency for the CBRS measurement; and obtaining received signal strength indicator (RSSI) information by performing the CBRS measurement based on the M-plane configuration;

transmitting CBRS parameters including the RSSI information to the O-DU, wherein a data structure of the CBRS parameters is determined based on a type of the RU.

5. The method of claim 4, further comprising:

performing a transport layer resolution and recovering an internet protocol (IP) address of the O-DU;

performing a synchronization with a primary reference clock; and performing a network configuration (NETCONF) call home procedure to the O-DU.

6. The method of claim 4, further comprising:

transmitting at least one CBRS parameter to the O-DU, wherein the at least one CBRS parameter is specified in a data model according to a yet another next generation (YANG) model, wherein the type of the RU is one of a CBRS RU or a non-CBRS RU.

7. An electronic device configured to perform functions of an open radio access network distributed unit (O-DU), comprising:

at least one transceiver comprising circuitry; and at least one processor, comprising processing circuitry, operably coupled to the at least one transceiver, and individually and/or collectively configured to:

control the at least one transceiver to transmit a management-plane (M-plane) configuration for requesting a citizens broadband radio service (CBRS) measurement to a radio unit (RU), the M-plane configuration including bandwidth information for indicating a bandwidth for the CBRS measurement and frequency information for indicating a starting frequency for the CBRS measurement; and control the at least one transceiver to receive CBRS parameters including received signal strength indicator (RSSI) information for the CBRS measurement from the RU based on the M-plane configuration, wherein a data structure of the CBRS parameters is determined based on a type of the RU.

8. The electronic device of claim 7, wherein the at least one processor is further configured, individually and/or collectively, to:

perform a secure shell (SSH) connection establishment;

perform a user-plane (U-plane) configuration between the RU and the O-DU;

activate a performance measurement of the RU; and obtain, from the RU, state information including synchronization information.

9. The electronic device of claim 7, wherein the at least one processor is further configured to control the at least one transceiver to receive at least one CBRS parameter from the RU, and wherein the at least one CBRS parameter is specified in a data model according to a yet another next generation (YANG) model, wherein the type of the RU is one of a CBRS RU or a non-CBRS RU.

10. An electronic device configured to perform functions of an open radio access network radio unit (O-RU), comprising:

at least one transceiver comprising circuitry; and at least one processor, comprising processing circuitry, operably coupled to the at least one transceiver, and individually and/or collectively configured to:

control the at least one transceiver to receive a management-plane (M-plane) configuration for requesting a citizens broadband radio service (CBRS) measurement from an open radio access network distributed unit (O-DU), the M-plane configuration including bandwidth information for indicating a bandwidth for the CBRS measurement and frequency information for indicating a starting frequency for the CBRS measurement; and obtain received signal strength indicator (RSSI) information by performing the CBRS measurement based on the M-plane configuration;

control the at least one transceiver to transmit CBRS parameters including the RSSI information to the O-DU, wherein a data structure of the CBRS parameters is determined based on a type of the RU.

11. The electronic device of claim 10, wherein the at least one processor is further configured, individually and/or collectively, to:

perform a transport layer resolution and recover an internet protocol (IP) address of the O-DU;

perform a synchronization with a primary reference clock; and perform a network configuration (NETCONF) call home procedure to the O-DU.

12. The electronic device of claim 10, wherein the at least one processor is configured to control the at least one transceiver to transmit at least one CBRS parameter to the O-DU, wherein the at least one CBRS parameter is specified in a data model according to a yet another next generation (YANG) model, and wherein the type of the RU is one of a CBRS RU or a non-CBRS RU.

* * * * *